(12) United States Patent
Taber

(10) Patent No.: US 6,905,604 B2
(45) Date of Patent: Jun. 14, 2005

(54) METHOD OF CONVERTING FEEDWATER TO FRESH WATER

(75) Inventor: Joseph J. Taber, Socorro, NM (US)

(73) Assignee: New Mexico Technical Research Foundation, Socorro, NM (US)

(*) Notice: Subject to any disclaimer, the term of this patent is extended or adjusted under 35 U.S.C. 154(b) by 0 days.

(21) Appl. No.: 10/353,871

(22) Filed: Jan. 29, 2003

(65) Prior Publication Data
US 2004/0144725 A1 Jul. 29, 2004

(51) Int. Cl.$^7$ .............................................. B01D 61/00
(52) U.S. Cl. ..................... 210/652; 210/651; 210/195.2; 210/257.2
(58) Field of Search ............................. 210/257.2, 652, 210/650, 651, 195.2, 805; 166/243, 245

(56) References Cited

U.S. PATENT DOCUMENTS

| | | | | |
|---|---|---|---|---|
| 3,839,206 A | * | 10/1974 | Welch | |
| 4,160,727 A | * | 7/1979 | Harris, Jr. ................... | 210/639 |
| 4,241,787 A | * | 12/1980 | Price | |
| 4,243,523 A | * | 1/1981 | Pelmulder | |
| 4,332,685 A | * | 6/1982 | Nowlin et al. .............. | 210/638 |
| 4,366,063 A | * | 12/1982 | O'Connor | |
| 4,773,991 A | * | 9/1988 | Aid | |
| 4,848,460 A | | 7/1989 | Johnson, Jr. et al. | |
| 5,006,234 A | * | 4/1991 | Menon et al. ................ | 210/98 |
| 5,160,608 A | * | 11/1992 | Norton ........................ | 210/134 |
| 5,250,185 A | | 10/1993 | Tao et al. | |
| 5,282,972 A | * | 2/1994 | Hanna et al. ................ | 210/652 |
| 5,578,205 A | | 11/1996 | Martin | |
| 5,925,255 A | | 7/1999 | Mukhopadhyay | |
| 6,068,764 A | | 5/2000 | Chau | |
| 6,103,125 A | * | 8/2000 | Kuepper | |
| 6,183,646 B1 | | 2/2001 | Williams et al. | |
| 6,241,892 B1 | | 6/2001 | Whitworth | |
| 6,334,955 B1 | | 1/2002 | Kawashima et al. | |
| 6,365,051 B1 | | 4/2002 | Bader | |
| 6,395,181 B1 | | 5/2002 | Mullerheim | |

* cited by examiner

Primary Examiner—Ana Fortuna
(74) Attorney, Agent, or Firm—R W Becker & Associates; R W Becker

(57) ABSTRACT

A method is provided for converting feedwater to fresh water utilizing existing water pressures and high flow rates. At least one reverse osmosis unit is disposed in a feedwater supply conduit. Feedwater is conveyed through the supply conduit and the reverse osmosis unit at a pressure that exceeds the osmotic pressure for solids dissolved in the feedwater. A first stream of fresh water is withdrawn from the reverse osmosis unit as permeate, and a second stream is withdrawn therefrom as effluent. The effluent is returned to, or continues to flow in, the supply conduit downstream of the reverse osmosis unit.

13 Claims, 3 Drawing Sheets

METHOD OF CONVERTING FEEDWATER TO FRESH WATER

BACKGROUND OF THE INVENTION

The present invention relates to a method for economically converting salty or brackish water to fresh water by utilizing the existing water pressures that are available in operations such as the injection of water for oil recovery.

There is an increasing need for fresh water in various parts of the world, and a number of these areas are near operations where large amounts of water are pumped at pressures that can be utilized to purify water by reverse osmosis. Although reverse osmosis is widely used to remove dissolved solids from various impure waters, a few inherent problems limit its overall effectiveness. Chief among these are:

1. The energy cost for pumping the raw feedwater up to pressures sufficient for reverse osmosis.
2. The disposal of the reject water, whose saltiness is much increased over that of the original feedwater.
3. Membrane fouling, both from entrained solids and from a buildup of the rejected ions on the membrane surface.

Current reverse osmosis practices address these difficulties in various ways, but it is believed that none have solved all of the problems as effectively and economically as is proposed by the present invention.

Disposal of the reject water for reverse osmosis remains a problem, especially in areas where laws restrict its discharge into streams, underground, or on the surface. To overcome the problem of the discharge of large volumes of salty water, U.S. Pat, No. 6,241,892, T. M. Whitworth, provides a process wherein the rejected material consists primarily of the solid salts, but even these small volumes must be disposed of or utilized in some way.

Membrane fouling is always a limitation in reverse osmosis and is often handled by simply halting the operation and using a procedure such as flushing to clean the surface of the membranes, but this interruption reduces the overall conversion efficiency of the feedwater to fresh water.

Therefore, there have been many attempts to improve on the membrane flushing/cleaning systems, or to pre-treat the feedwater so flushing is not needed as often.

For example, U.S. Pat. No. 6,334,955, T. Kawashima and T. Kawada, requires a timer that periodically opens and closes a special flushing valve to clean the reverse osmosis membranes during fresh water generation work, when interrupted, or when restarting after interruption, but the device adds to the complexity and cost of the system.

A number of physical and chemical methods have been studied to improve the quality of various feedwaters prior to contact with the reverse osmosis membranes. By way of example:

U.S. Pat. No. 6,395,181, S. B. Mullerheim, uses physical separation methods to remove solids and floatable materials;

U.S. Pat. No. 6,365,051, M. S. Bader, adds an organic solvent to precipitate the dissolved salts;

U.S. Pat. No. 6,183,646, E. E. Williams et al., treats the feedwater with agents designed to prevent biofouling;

U.S. Pat. No. 5,925,255, D. Mukhopadhyay, uses special treatments at high pH to remove hardness, etc. from feedwater prior to reverse osmosis;

U.S. Pat. No. 5,250,185, F. T. Tao, et al., softens the feedwater and raises the pH prior to reverse osmosis to reject more of the boron.

Thus, although there have been many efforts to try to solve certain facets of the aforementioned reverse osmosis problems, all known methods would add to the cost of the fresh water produced, and none of the improvements can solve all of the problems at the same time.

It is therefore an object of the present invention to utilize the existing pressures and high-flow velocities, which are available in situations such as waterflood injection water systems, to produce fresh water by reverse osmosis at a very low cost, with a minimum of membrane fouling, and with no wastewater disposal problems.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The method of the present invention includes the steps of disposing at least one reverse osmosis unit in a feedwater supply conduit, conveying through the supply conduit and the reverse osmosis unit feedwater at a pressure that exceeds the osmotic pressure for solids dissolved in the feedwater, and withdrawing from the reverse osmosis unit a first stream of fresh water as permeate, and a second stream of effluent, wherein the effluent is returned to, or continues to flow in, the supply conduit downstream of the reverse osmosis unit.

The present invention has a number of advantages. First of all, no additional power is required for the reverse osmosis. Furthermore, the membranes of the reverse osmosis unit or units are kept cleaner, and therefore the transport of fresh water through the membranes is enhanced by the high velocity of the feedwater as it flows past the membrane surfaces. In addition, there are no reject water disposal problems, since the reject water or effluent, which is still pressurized, is utilized for a further purpose.

Further specific features of the present invention will be described in detail subsequently.

DESCRIPTION OF PREFERRED EMBODIMENTS

Figure 1:
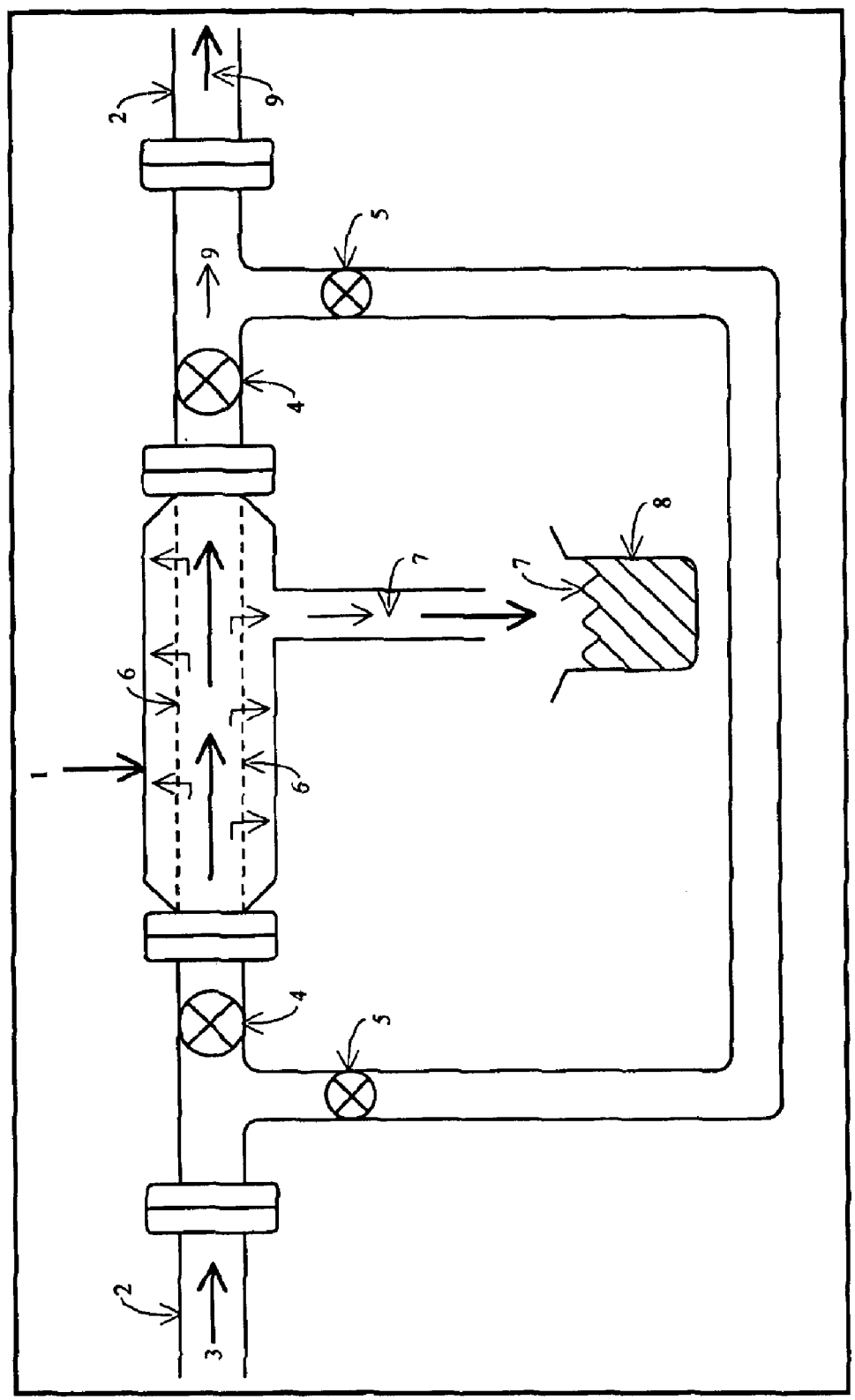
FIG. 1 illustrates a first embodiment of a system for carrying out the method of the present invention.

Referring now to the drawings in detail, one of the preferred embodiments is illustrated in FIG. 1, which shows a reverse osmosis unit 1, which is installed in a pipeline 2 that is connected to a water injection well in an oilfield (not shown). The supply water 3 (or feedwater) comes from the high-powered pumps of, for example, the oilfield injection water system, and is generally at a pressure that is sufficient for reverse osmosis; the water is usually filtered before it is sent to the pipeline distribution system. In operation, the valves 4 are normally open and the valves 5 are largely closed so that the bulk of the high-pressure feedwater flows around the semi-permeable membranes 6 at high velocity and flows on to the injection well or wells. If the pressure is high enough to exceed the osmotic pressure of the brackish or salty feedwater (for example 350 psi for the salt concentration of seawater) some fresh water (or permeate) 7 is forced through the membranes 6 and is collected in the symbolic container 8 as high quality fresh water, normally at or near atmospheric pressure, while the salt is rejected and is carried on towards the injection well in the reject water 9. Thus there are no saltwater disposal problems since 100% of the reject water 9 is injected into oil reservoirs to displace oil. Since the volume of water flowing past the membranes is much greater than in most reverse osmosis systems, the increase in the salt concentration of the reject water is more modest. This increased saltiness is not a problem in the injection water, and it may even be a distinct advantage for oil recovery in those reservoirs that contain some types of clays that are prone to swelling with fresher water. This complete absence of any saltwater disposal problem is a key feature of the present invention.

In the embodiment illustrated in FIG. 1, one or more of the valves 5 are disposed in a by-pass loop, and are fully opened, partially opened, or closed as needed for installation purposes, servicing, adjustment of flow rate, etc.

The composition of the feedwater 3 (as well as the pressure at which it is supplied) covers a very wide range. About one half of all oil produced in the USA is aided by waterflooding and the EPA estimates that 21 billion barrels are injected annually for this purpose. The oil producers will utilize any water that is available and the injection water can range from any available fresh water or brackish water to the saltier underground waters often located in or near oil reservoirs. In mature waterfloods, salty formation water may be produced along with the oil and then reinjected.

Several types of water that could be encountered in oilfield waterfloods are listed in Table 1, along with the approximate natural osmotic pressure and the pressure needed for a good flow rate across the reverse osmosis membranes. Since the pressures used in waterfloods range from less than 100 to a few thousand pounds per square inch (psi) it can be seen in Table 1 that the present invention encompasses most of the waters that are now being injected for oil recovery. Therefore, no limits are placed on the pressures at which the present invention is effective as long as the reverse osmosis membranes can withstand the pressure. Since commercial reverse osmosis units are readily available for all types of brackish waters, and higher pressure units are available for the saltiest of seawaters, the present invention can be utilized immediately for all feedwaters except possibly the most concentrated brines. However, better membranes and higher pressure units are being developed and are therefore not excluded from the present invention.

The reverse osmosis unit 1 shown in FIG. 1 is just a schematic to show the direct application of the present invention to a water injection system in an oilfield. The reverse osmosis membrane unit 1 is simply flanged into the injection line to make as few changes as possible. Commercial membrane units (or modules) come in different lengths and diameters with end plates that can be adapted to standard oilfield piping systems.

The sketch in FIG. 1 is not intended to show the actual arrangement of the membranes within the membrane unit 1. Either of the commercial spiral wound or hollow fiber membranes can be utilized in the present invention. A tubular membrane configuration may also work well because higher velocities of feedwater may be possible. The choice depends on the conditions: spiral wound membranes are available for the lower dissolved solids in some brackish water applications; hollow fiber configurations are very effective for higher salt concentrations (similar to seawater) because they can withstand higher pressures, have a higher surface area to volume ratio, and cause less pressure drop in the feedwater stream. To further enhance the benefits of the present invention, in some applications membrane modules are utilized that are designed to allow more space around the hollow fiber bundles to accommodate the fast-flowing feedwater. This luxury is possible since the contemplated oilfield application differs markedly from the usual reverse osmosis facilities because here the primary product is actually the saltwater effluent, all of which is injected to produce oil at a profit. The low-cost fresh water is only a byproduct but it can be a valuable one in areas where fresh water is needed. Therefore, full advantage can be taken of the much larger volumes of supply water that pass the membranes, and the usual conversion efficiency question (i.e., fresh water produced per unit of supply water) will not be a concern.

The large volume of feedwater that flows at high velocity past the membranes in the present invention increases the efficiency in at least two ways. First, as the water permeates the membrane under the applied pressure, a higher salt concentration is left behind at the surface of the membranes. This build up of a Concentrated Polarization Layer (or CPL) retards the flow of pure water through the membrane. Normally these excess dissolved salts are removed by slow diffusion away from the membrane surface until they reach the flowing feedwater stream. However, the large volume and high velocity of the feedwater of the inventive system helps to sweep away this CPL continuously, and much more effectively than in those systems that must be concerned with reducing the volume of wastewater discharged. Secondly, the high velocity and more turbulent flow of the feedwater in the membrane modules keeps the membrane surface much clearer of any entrained solids or other foreign material that can clog the membranes. Thus the membranes of the present invention need less frequent cleaning.

FIG. 1 illustrates a simple membrane module that allows high flow rates when added to an existing pipeline such as in an oilfield waterflood. In large scale reverse osmosis systems additional modules are often added in parallel and/or in series to increase the overall production of the fresh water, and these options are included in the present invention.

Figure 2:
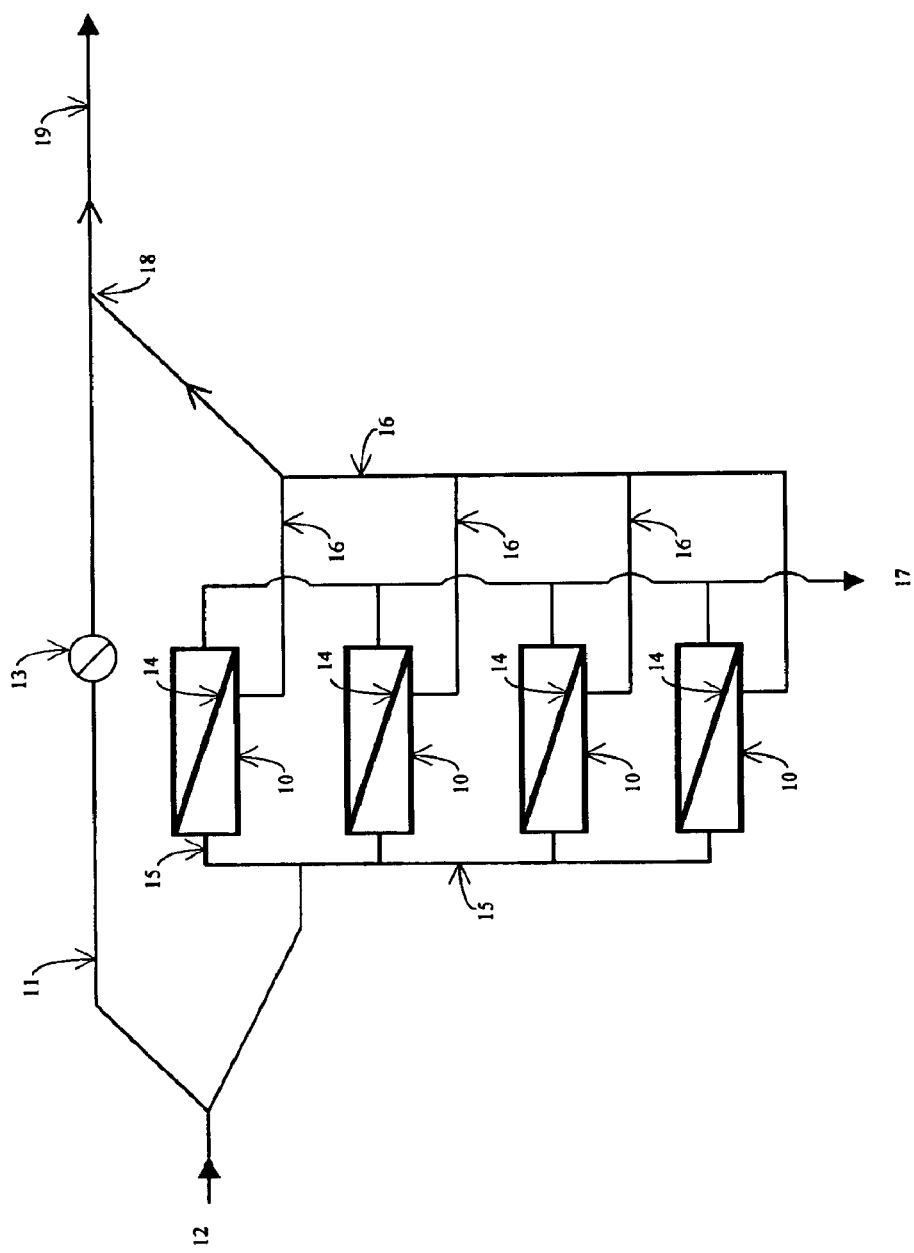
FIG. 2 shows a second embodiment for carrying out the inventive method.

In another preferred embodiment shown in FIG. 2, four modules or units 10 are shown that are installed on a high-pressure water line 11 as illustrated. In this embodiment the feedwater 12 can be any water source that meets the criteria of the present invention, that is, it is being pumped for some use at a pressure that exceeds the osmotic pressure for the dissolved solids in the supply stream. In addition to water on its way to injection wells in oilfields, the feedwater 12 includes various applications such as cooling water in power plants where large volumes are circulated, and the small increase in salt concentration is not a problem. The assembly in FIG. 2 can be installed wherever it is convenient and where fresh water is desired. For example, in a pump house where the water is pumped to the pressure needed for the waterflood or other use, on offshore platforms where seawater is injected in waterfloods and where freshwater is always needed for various purposes, etc.

In operation, the pressure control valve or regulator 13 is partially closed or adjusted to ensure that a sufficient portion of feedwater 12 flows through the modules 10 and past the membranes 14 at high velocities to ensure that the aforementioned membrane cleaning advantages occur. Commercial "off the shelf" membrane modules may be used for the modules 10 as long as they are designed for the pressures of the system. To ensure the high velocity of the feedwater 12 past the membranes, it is advantageous if the feedwater distribution piping 15, valves and fittings (not shown), along with the reject water piping system 16, are of a larger diameter than those usually used in reverse osmosis systems that do not utilize the large volumes of the present invention.

In the embodiment shown in FIG. 2, large volumes of fresh water permeate 17 are produced efficiently for very low cost since the feedwater is pumped to the required pressure for other purposes. The large volume of reject water 16 rejoins the flowing feedwater 12 at 18 as shown in FIG. 2. The combined working water stream 19 flows on to its point of utilization, such as the aforementioned injection wells, cooling water, etc.

Figure 3:
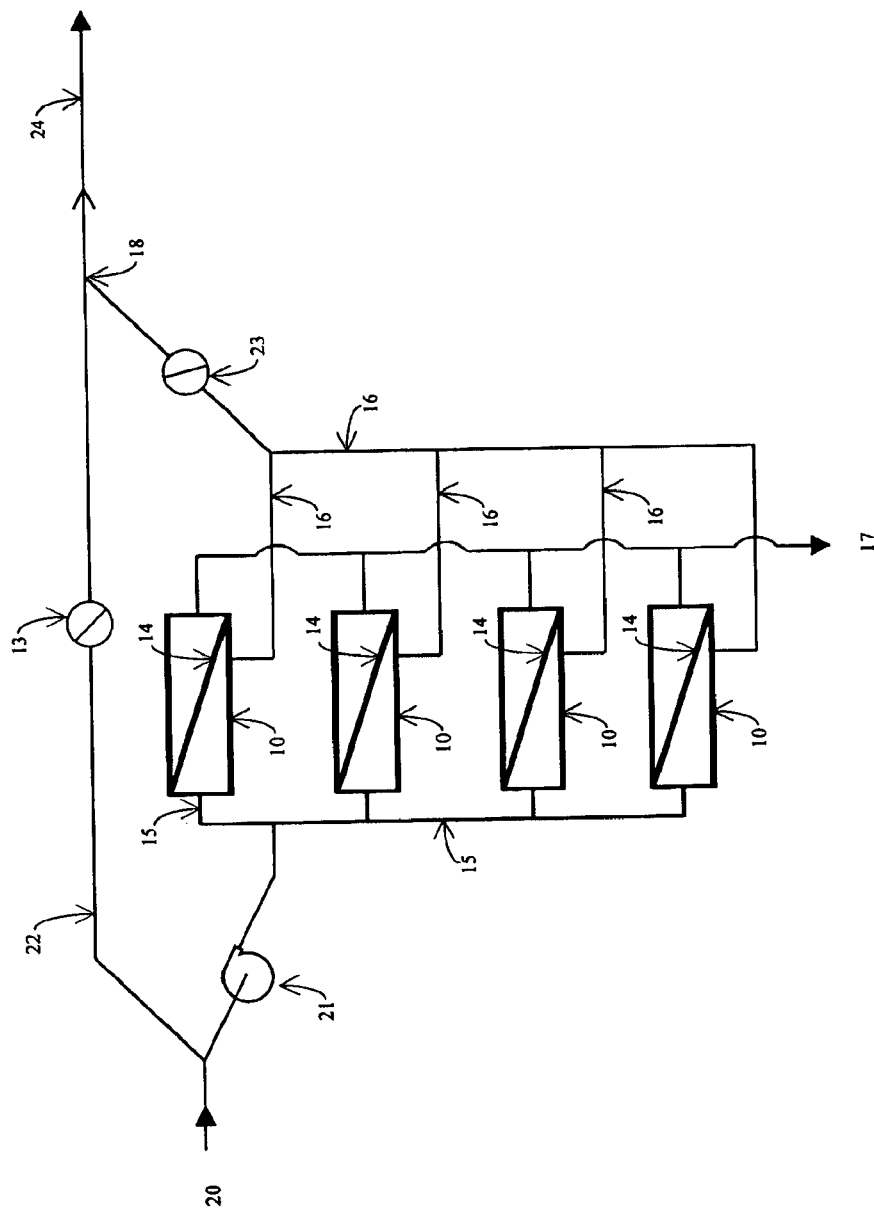
FIG. 3 shows a modified embodiment of the system of FIG. 2.

Another preferred embodiment of the invention is illustrated in FIG. 3 for those situations where the high-velocity feedwater 20 is not pressurized enough to exceed the osmotic pressure of the dissolved solids in the feedwater. In these cases a small booster pump 21 is installed to increase the pressure of the feedwater before it enters the membrane modules 10. In general, the reverse osmosis modules array in FIG. 3 functions the same as in FIG. 2, and thus the same reference numbers have been used as in FIG. 2. The feedwater 20 splits into two streams and the adjustable pressure control valve 13 is not necessarily closed as far in this embodiment because the booster pump 21 helps to send a portion of the feedwater 20 on through the modules 10 as shown. To ensure that the osmotic pressure of the feedwater is exceeded, a pressure-control and relief valve 23 is installed on the reject pipeline 16 before it rejoins the main pipeline 22 at 18. This valve drops the higher-pressure water 16 to a value close to that of the main feedwater 20. The booster pump 21, and the control valves 13 and 23, are all adjusted in concert so that the pressure of the reject water will not be too dissimilar from the pressure in the main pipeline 22. There is no danger of backflow through the relief valve 23 because of the higher pressure that is maintained on the feedwater side of the membrane in the array and at all points between the booster pump 21 and the relief-control valve 23. This pressure is normally at least twice the osmotic pressure for the dissolved solids in the feedwater (see Table 1). Again, as in the other embodiments of the present invention, a high-flow rate of the feedwater past the membranes 14 is maintained so that the membranes are less subject to fouling and the reverse osmosis transport of fresh water through the membrane is enhanced. Also, the reject water becomes part of the pressurized water system at 18, and the combined water 24 is fully utilized so there is no disposal problem. Although some power is required for the booster pump the amount is always somewhat less than for those reverse osmosis systems that do not use already-pressurized water as in the present invention. It should be noted that although the modules 10 are illustrated as being disposed in a parallel relationship, they could also be disposed in series, or partly in parallel and partly in series.

The present invention is, of course, in no way restricted to the specific disclosure of the specification and drawings, but also encompasses any modifications within the scope of the appended claims.

TABLE 1

Pressures Required for Reverse Osmosis of Various Types of Predominantly Salty Feedwaters

| Water Type | Total Dissolved Solids mg/l (parts/million) (ppm) | Natural Osmotic Pressure (psi) (~0.01/ppm) | Pressure Desired for Good Flow Rates Across Reverse Osmosis Membranes (psi) |
|---|---|---|---|
| Potable Waters | | | |
| W.H.O. Specifications | 500 | 5 | 10–20 |
| EPA Standards | 1,000 | 10 | 20–30 |
| Substandard drinking waters | 1,000–7,000* | 10–70 | 20–140 |
| Brackish Water | 1,500–5,000 | 15 | 30–50 |
| | | 50 | 100–150 |
| Seawater | 35,000 | 350 | 800–1,200 |
| Concentrated brines | 200,000–300,000 | 2,000–3,000 | 4,000–5,000 6,000–7,000 |

*up to 7,000 ppm is potable for large animals only 2,500 is suggested upper limit for Humans.

What is claimed is:

1. A method of converting feedwater from an oil field to fresh water, including the steps of:
    disposing at least one reverse osmosis unit directly in a feedwater supply conduit for receiving flow of said feedwater therethrough;
    conveying, in a non-intermittent manner, through said at least one reverse osmosis unit, feedwater which is at a pressure that exceeds the osmotic pressure for solids dissolved in said feedwater;
    withdrawing from said at least one reverse osmosis unit a first stream of fresh water as permeate; and
    allowing a second stream of effluent to continue to flow in said feedwater supply conduit downstream of said at least one reverse osmosis unit, without any recycling of said effluent to said at least one reverse osmosis unit.

2. A method according to claim 1, which includes the further step of disposing a pump upstream of said at least one reverse osmosis unit, only if needed, to bring feedwater to a required pressure.

3. A method according to claim 1, wherein respective flow control valves are disposed in at least one of said by-pass loop and said feedwater supply conduit.

4. A method according to claim 1, wherein a by-pass loop is provided that communicates with said feedwater supply conduit on opposite sides of said at least one reverse osmosis unit.

5. A method according to claim 1, wherein a plurality of reverse osmosis units are provided that are disposed in parallel and/or in series.

6. A method according to claim 1, wherein said feedwater is non-potable water.

7. A method according to claim 1, wherein said feedwater is at a pressure of >100 psi.

8. An apparatus for converting feedwater in a pressurized feedwater supply conduit in a water injection system in an oilfield to fresh water comprising:
    at least one reverse osmosis unit disposed in said feedwater supply conduit for receiving feedwater from said oilfield at a pressure that exceeds the osmotic pressure for solids dissolved in said feedwater;
    means for withdrawing from said at least one reverse osmosis unit a first stream of fresh water as permeate; and
    means for allowing a second stream of effluent to continue to flow in said feedwater supply conduit, downstream of said at least one reverse osmosis unit, without any recycling of said effluent to said at least one reverse osmosis unit.

9. An apparatus according to claim 8, wherein a pump is disposed upstream of said at least one reverse osmosis unit, only if needed to bring feedwater to a required pressure.

10. An apparatus according to claim 8, wherein a by-pass loop is provided that communicates with said feedwater supply conduit on opposite sides of said at least one reverse osmosis unit.

11. An apparatus according to claim 10, wherein respective flow control valves are disposed in at least one of said by-pass loop and said feedwater supply conduit.

12. An apparatus according to claim 8, wherein a plurality of reverse osmosis units are provided that are disposed in parallel and/or in series.

13. A method converting feedwater in a water injection system in an oilfield to fresh water, including the steps of:

disposing at least one reverse osmosis unit in a feedwater supply conduit for receiving feedwater therefrom;

conveying, through said at least one reverse osmosis unit, feedwater which is at a pressure that exceeds the osmotic pressure for solids dissolved in said feedwater;

withdrawing from said at least one reverse osmosis unit a first stream of fresh water as permeate, and a second stream of effluent; and allowing said effluent to continue flow in said supply conduit downstream of said at least one reverse osmosis unit, without any recycling of said effluent to said at least one reverse osmosis unit.

* * * * *